United States Patent Office 3,288,617
Patented Nov. 29, 1966

3,288,617
REFRACTORY BRICK OF BURNT MAGNESIA AND PROCESS OF MANUFACTURE
Russell Pearce Heuer, Villanova, Pa., assignor to General Refractories Company, a corporation of Pennsylvania
No Drawing. Filed Apr. 22, 1964, Ser. No. 361,867
Claims priority, application Austria, May 31, 1963,
A 4,406/63
1 Claim. (Cl. 106—60)

The present invention relates to refractory bricks, blocks and masses of burnt magnesia, which are mainly suitable for lining LD converters or other oxygen blowing converters. The invention relates also to a process of manufacturing these products.

When reference is made herein to a brick, it is intended to include also a block or a mass of refractory.

A purpose of the invention is to make basic refractory bricks of the kind mentioned which are better suited for use in the making of steel with the aid of oxygen or of oxygen enriched air than the refractory materials previously employed.

A further purpose is to make it possible to produce a basic refractory brick from burnt magnesia which contains up to 88 percent of MgO, and which contains more than 5 perecnt of lime, up to 2 percent of silica and more than 5 percent dicalcium ferrite.

It has been found that the process of the invention can be accomplished when the contents of MgO and of silica in the magnesia which is employed do not exceed a certain maximum, where a certain minimum amount of lime and of dicalcium ferrite are present, and where the lime is evenly distributed, this feature being of essential importance. Thus, refractory bricks according to the invention are composed of burnt magnesia which contains at most 88 percent MgO, at least 5 percent evenly distributed lime (the lime content as a practical matter may be as high as 15 or 20 percent), up to about 2 percent silica (the silica will in any case be more than 0.01 perecnt), and more than 5 percent dicalcium ferrite (the dicalcium ferrite may run as high as 15 percent or more).

A magnesia of the kind described may be obtained, for example, by burning magnesite from Hochfilzen, Austria, which has approximately the following typical composition in percentage by weight when the magnesia is burned:

| | Percent |
|---|---|
| $SiO_2$ | 0.5 |
| $Fe_2O_3$ | 5.0 |
| $Al_2O_3$ | 0.5 |
| CaO | 6.5 |
| MgO (by dif.) | 87.5 |
| Total | 100.00 |

As an alternative procedure, a magnesia having the desired composition may be used which has been obtained synthetically for instance from sea water, spent liquors or brines, with any additions, if necessary, required to secure the desired percentages of lime, silica, ferric oxide and alumina. A suitable adjusted high-grade sea water magnesia may alternatively be used.

Another starting material for the invention is a natural magnesite which produces a burnt magnesia which contains more than 4 percent lime, and therefore exceeds the lime content which is present in a burnt magnesia desired for direct manufacture of magnesia refractories containing more than 88 percent MgO. When such a natural magnesite, which contains dolomite or lime as an impurity to produce a lime content of more than 4 percent is burned, preferably in a vertical shaft kiln, the burnt product centains at least part of the dolomite or lime in the form of discrete particles having a higher lime content. These high lime particles are removed from the burned product by physical methods. One effective physical method for doing this is magnetic separation. The remaining beneficiated magnesia contains more than 88 percent MgO and may be used for the manufacture of refractory bricks, for example, by moistening it with water, and pressing it to form bricks, because the lime-containing particles have been removed as a by-product. A typical analysis of this beneficiated magnesia which is of no further interest for the purposes of the present invention, is as follows:

| | Percent |
|---|---|
| $SiO_2$ | 0.7 |
| $Fe_2O_3$ | 6.8 |
| $Al_2O_3$ | 0.7 |
| CaO | 2.4 |
| MgO (by dif.) | 89.4 |
| Total | 100.00 |

The by-product particles which have been separated have approximately the following composition:

| | Percent |
|---|---|
| $SiO_2$ | 0.5 to 2.0 |
| $Fe_2O_3$ | 5.0 to 8.0 |
| $Al_2O_3$ | 0.5 to 1.0 |
| CaO | 5.0 to 10.0 |
| MgO (by dif.) | 80.0 to 88.0 |

These particles are not suitable for direct use in manufacturing a magnesia refractory brick because the particles are not uniform. Some of the particles are white in color, and other particles have a brown color. The lime is not evenly distributed and this is a very serious defect. The phases which are present according to the analysis are not in equilibrium. When such a mass of particles in ground and moistened with water to form brick the free lime will react with the water and cracks will form.

I discovered however that this by-product can be rendered suitable and usable in making basic refractory brick by reburning it at a temperature of above 1350° C., preferably in a rotary kiln until the phases approach or reach a state of equilibrium. It will be evident that the reburning does not change the overall analyses of the product, but it does change the distribution of the phases and makes a very marked difference between the suitability of the material for making basic refractory brick.

Under the conditions encountered in the reburning operation the lime will combine with silica to form dicalcium silicate and sometimes small amounts of tricalcium silicate may form, whereas the oxide of iron and the remaining lime form dicalcium ferrite in an amount exceeding 5 percent of the product obtained by reburning. The resulting reburnt product contains less than 88 percent MgO. For best results, the material fed to the kiln for reburning should have a particle size below 4 mm. because this will increase the uniformity of distribution of the lime in the magnesia being burnt. The disintegrated material to be fed to the kiln may be briquetted, if desired, with caustic magnesia and magnesium sulphate, or with sulphite waste or other organic binders and the briquettes may be calcined in a shaft kiln.

The calcining operation may be controlled to yield a dense calcined magnesia having a bulk specific gravity of about 3.20. A lower bulk specific gravity of about 2.90 can also be produced if desired. In general, however, the bulk specific gravity should preferably be at least 3.0.

The product obtained after this calcining may be used according to the invention for the manufacture of refractory bricks which may be used in vessels or furnaces of all kinds suitable for making steel with the aid of gaseous oxygen such as LD converters, Kaldo converters and others. For this purpose, the calcined product, consisting of the calcined magnesia, is ground, moistened with water which contains a binder such as sulfuric acid, and is then pressed to form bricks. The resulting bricks may be used without being burnt or may be burnt in a kiln, if desired, before being used. The burnt bricks may be dipped in tar if desired for impregnating or coating them. To obtain tar-bonded bricks, the reburnt product is mixed with hot tar (desirably 4 to 7 percent on the refractory composition) and the mixture is pressed to form bricks under a pressure exceeding 300 kg. per sq. cm. or tamped to form bricks. The resulting bricks are ready for use immediately after having cooled down.

It may be stated that where a natural magnesite of the kind stated is used directly, it will contain in burnt form more than 4 percent lime, which is more than the amount desired in a burnt magnesia containing more than 88 percent MgO for the direct manufacture of refractory brick. The natural magnesite is burnt until it has a bulk specific gravity of at least 2.9, preferably 3.0 or higher, and afterwards the burnt product is separated by physical means such as magnetic separation, into magnesia containing more than 88 percent MgO and magnesia containing less than 88 percent. The magnesia containing less than 88 percent MgO contains at least 5 percent of lime (the lime content may go as high as 15 or 20 percent or more), and up to about 2 percent of silica (the silica content may be as low as 0.1 percent). The magnesia containing less than 88 percent MgO is reburnt at a temperature exceeding 1350° C. and preferably in a rotary kiln, to increase its dicalcium ferrite content above 5 percent (it may go up to 15 percent or more) and the reburnt magnesia is shaped into bricks when it is desired to produce the same.

The burnt magnesia used in the bricks according to the present invention contains more than 5 percent $Fe_2O_3$ (the $Fe_2O_3$ content may be as high as 10 or 15 percent or more) and contains about 80 to 88 percent MgO.

Whereas the binder is preferably tar, other binders, such as sulfuric acid or sulphite waste, to which water may be added, may be used. The basic refractory may be employed in burnt or unburnt condition and burnt products may be coated or impregnated with tar if desired.

Uniform distribution of the lime is essential because it affords the advantage that the products are highly suitable for use under the conditions prevailing for example in converters during the oxygen blowing process.

The amount of dicalcium ferrite contained in the products according to the invention is determined by first calculating the amount of lime required for combining with the silica which is present to form dicalcium silicate and deducting this lime from the total amount of lime to determine the surplus of lime. It is then assumed that this surplus of lime reacts with iron oxide to form dicalcium ferrite. Any alumina which is present in small quantities will form tetracalcium aluminum ferrite (Brown-millerite) and it is assumed that this compound is included in the calculated amount of dicalcium ferrite. For obtaining good results the silica content should be less than two percent.

Whereas the brick according to the present invention are mainly intended for lining converters and other metallurgical vessels and furnaces for carrying out blowing operations with oxygen-enriched air, these may also be used for purposes for which tar-bonded bricks of dolomite or dolomitic magnesite are used, for instance, instead of large blocks for lining the walls of electric arc furnaces or other similar purposes.

The burnt magnesia analyses stated above are based on the burnt product, without loss on ignition. The percentage of magnesia is determined by difference. All percentages are stated by weight.

In view of my invention and disclosure variations and modifications to meet individual whim or particular need will doubtless become evident to others skilled in the art, to obtain all or aprt of the benefits of my invention without copying the process and composition shown, and I therefore claim all such insofar as they fall within the reasonable spirit and scope of my claim.

Having thus described my invention, what I claim as new and desire to secure by Letters Patent is:

A process of manufacturing refractory bricks suitable for the lining of an oxygen-blowing converter which comprises burning natural magnesite which contains in burned condition more than 4% lime, until it has a bulk specific gravity of at least 2.9, separating the magnesia particles by physical methods into particles containing more than 88% MgO and particles containing 80 to 88% MgO, at least 5% lime, up to 2% silica and at least 5% ferric oxide, reburning the said particles containing 80 to 88% MgO at a temperature exceeding 1350° C. to form dicalcium ferrite as a component in excess of 5%, mixing hot tar with the reburned magnesia and molding the mixture into a basic refractory brick at a pressure exceeding 300 kg./sq. cm.

References Cited by the Examiner
UNITED STATES PATENTS
2,744,021   5/1956   Bargezi _____ 106—60
FOREIGN PATENTS
583,009   12/1946   Great Britain.

TOBIAS E. LEVOW, *Primary Examiner.*

J. POER, *Assistant Examiner.*